(12) United States Patent
Beck et al.

(10) Patent No.: US 8,718,278 B2
(45) Date of Patent: May 6, 2014

(54) METHOD AND SYSTEM FOR ENCRYPTION OF A DATASTREAM

(75) Inventors: Felix C. Beck, Mainz (DE); Rolf Schaefer, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 13/316,725

(22) Filed: Dec. 12, 2011

(65) Prior Publication Data

US 2012/0189118 A1   Jul. 26, 2012

(30) Foreign Application Priority Data

Jan. 20, 2011   (EP) .................................... 11151573

(51) Int. Cl.
*H04L 9/18* (2006.01)
*H04L 9/06* (2006.01)
*H04L 9/08* (2006.01)
*H04L 9/22* (2006.01)
*H04L 9/26* (2006.01)

(52) U.S. Cl.
CPC ............ *H04L 9/0662* (2013.01); *H04L 9/0869* (2013.01); *H04L 9/22* (2013.01); *H04L 9/26* (2013.01)
USPC ......................................................... 380/42

(58) Field of Classification Search
None
See application file for complete search history.

(56) References Cited

U.S. PATENT DOCUMENTS

| 6,125,186 | A | * | 9/2000 | Saito et al. ..................... 380/287 |
| 6,785,389 | B1 |   | 8/2004 | Sella et al. |
| 7,082,453 | B1 |   | 7/2006 | Shackleford et al. |
| 2003/0072446 | A1 | * | 4/2003 | Jaquette .......................... 380/46 |
| 2003/0145216 | A1 | * | 7/2003 | Nakane et al. ................. 713/193 |
| 2004/0010526 | A1 | * | 1/2004 | Dichtl ............................. 708/251 |
| 2004/0156500 | A1 | * | 8/2004 | Faber et al. ..................... 380/42 |
| 2004/0208322 | A1 | * | 10/2004 | Ozluturk ......................... 380/268 |

FOREIGN PATENT DOCUMENTS

JP             06342257            12/1994

* cited by examiner

*Primary Examiner* — Gilberto Barron, Jr.
*Assistant Examiner* — David Le
(74) *Attorney, Agent, or Firm* — William A. Kinnaman, Esq.; Kevin P. Radigan, Esq.; Heslin Rothenberg Farley & Mesiti P.C.

(57) ABSTRACT

A method for an encryption of a data stream is provided. The method includes: providing the data stream, providing at least two first random number generators having a first cryptographic strength, wherein each of the at least two first random number generators is switchable between states including a clocked state and a working state, and providing a second random number generator having a second cryptographic strength, wherein the second cryptographic strength is higher than the cryptographic strength. The method further includes switching the states of the at least two first random number generators using an output of the second random number generator and using an XOR-function for combining the data stream with an output of one of the at least two first random number generators, which is in the working state, such that a ciphered data stream is created.

20 Claims, 4 Drawing Sheets

METHOD AND SYSTEM FOR ENCRYPTION OF A DATASTREAM

PRIOR FOREIGN APPLICATION

This application claims priority from European patent application number EP11151573.0, filed Jan. 20, 2011, which is hereby incorporated herein by reference in its entirety.

BACKGROUND

This invention relates generally to a method for encryption of a data stream, and to a crypto system. The invention relates further to a computer system, a data processing program, and a computer program product.

Encryption or ciphering of data streams is often a requirement in modern data transmission techniques throughout all available media, e.g., wire-based or wireless. Requirements for privacy as well as legal requirements make ciphering of data streams a field of growing importance. However, compromises may be required to balance costs of computing for the encryption on one hand, and the speed of available algorithms on the other hand.

Stream ciphers are often used in applications where plain text comes in quantities of unknowable length. But not only plain text files need encryption, but also streams of Voice-over-IP packets or video stream data do as well. In general, stream ciphering is required wherever data streams of unknown length play a role, as may also be the case in modern cloud computing environments.

A transport medium for ciphered data may be anything from a secure wireless connection, a local area network (LAN) or a wide area network (WLAN) between servers. The physical connection may be established using land-based systems or wireless systems.

Random number generators—or pseudo-random number generators—play a significant role in this field as they are often used as stream ciphers. Unfortunately, fast random number generators like LFSRs (linear feedback shift register random based number generators) or RC4 (known as Rivest Cipher or Ron's Code after the inventor Ron Rivest) are vulnerable to cryptographic attacks, while random number generators with low vulnerability to cryptographic attacks are relative slow. Typically, random number generators used for systems with high cryptographic strength require intensive computing like complex multiplications of long numbers. Examples are of comparably secure systems may be the method Blum-Blum-Shub algorithm or the VEST (Very Efficient Substitution Transposition) algorithm. In the following, the term pseudo-random number generator and the term random number generator will be used as synonyms. The same may apply for the pairs ciphering and encryption as well as for de-ciphering an decryption.

Several approaches have been followed in order to find a good balance between the speed of an algorithm for stream cipher and costs in form of required hardware capacities. Document U.S. Pat. No. 6,785,389 B1 discloses a bit-stream generator including a plurality of linear feed shift registers operative to generate a bit stream. At least a first linear feed shift register is operative, when assigned as a generator during a first time period including at least one clock cycle to provide an output bit in each clock cycle within a first time period. At least a second linear feed shift register is operative, when assigned as an assignor during the first time period, to provide in each clock cycle an output bit for determining assignments of at least some of the plurality of linear feed shift registers for a second time period following the first time period. However, only LFSRs may be used here which have a relative low cryptographic strength.

Document U.S. Pat. No. 7,082,453 B1 discloses a counter that takes advantage of the speed and implementation of LFSR counters by utilizing separate digit counters, each digit counter having a period that is a relative prime to the other digit counter periods. The total period will be the product of all the digit counter periods. Since all digits count independently, there is no carry structure between the digits and hence no delays incurred by carry chains. The pseudo-random number counting sequence for each digit still occurs but is ameliorated by the fact that the digital periods are small and can be converted to decimal equivalents by table-lookup and residue lookup.

Document JP06-342257 discloses that a ciphering part sets initial values to respective LFSRs at the head of a frame, exclusively ORs generated pseudo-random number data and normal data, and sends out cipher-text data. The cipher-text data is added to the stored value of the LFSRs by exclusive OR and the results are stored in the LFSRs again. A deciphering part sets secret initial values, used in common to the ciphering part, in the respective LFSRs at the head of the frame and exclusively ORed with received cipher-text data and the results are stored in the LFSRs again. The same pseudo-random number data with the side of the ciphering part are generated. The received cipher-text and pseudo-random number data are exclusively ORed to obtain cipher-text data.

BRIEF SUMMARY

In view of the above-discussed drawbacks of available technology, there is a need for a stream cipher combining advantages of a fast stream ciphering with strong security elements, i.e., low vulnerability. This need may be addressed by a method for encryption as well as by a crypto system according to the independent claims presented herewith.

According to one embodiment, a method for an encryption of a data stream is provided. The method may comprise providing the data stream, at least two first random number generators (RDG) having a first cryptographic strength, wherein each of the at least two first random number generators is switchable between states comprising a clocked state and a working state and providing a second random number generator having a second cryptographic strength, wherein the second cryptographic strength is higher than the first cryptographic strength. The method further may comprise switching the states of the at least two first random number generators using an output of the second random number generator and using an XOR-function for combining the data stream with an output of one of the at least two linear feedback shift register random number generators, which is in the working state, such that a ciphered data stream—in particular a ciphered bit stream—is created.

In another embodiment, a crypto system for an encryption of a data stream is provided. The crypto system may comprise a providing unit adapted for providing the data stream, at least two first random number generators having a first cryptographic strength, wherein each of the at least two first random number generators is switchable between states comprising a clocked state and a working state. The crypto system may also comprise and a second random number generator having a second cryptographic strength, wherein the second cryptographic strength is higher than the first cryptographic strength. Further the crypto system may comprise a switching unit adapted for switching the states of the at least two first random number generators using an output of the second random number generator and an XOR-gate for combining the data stream with an output of one of the at least two first random number generators, which is in the working state, such that a ciphered data stream is created.

BRIEF DESCRIPTION OF THE SEVERAL VIEWS OF THE DRAWINGS

Various embodiments of the invention are described below, by way of example only, with reference to the attached drawings, wherein.

DETAILED DESCRIPTION OF EXEMPLARY EMBODIMENTS

In the following, a detailed description of the drawings will be given. All illustrations in the drawings may be schematic. Firstly, a block diagram of the method for encryption will be described. Afterwards, several method- and system components will be described.

Figure 1:
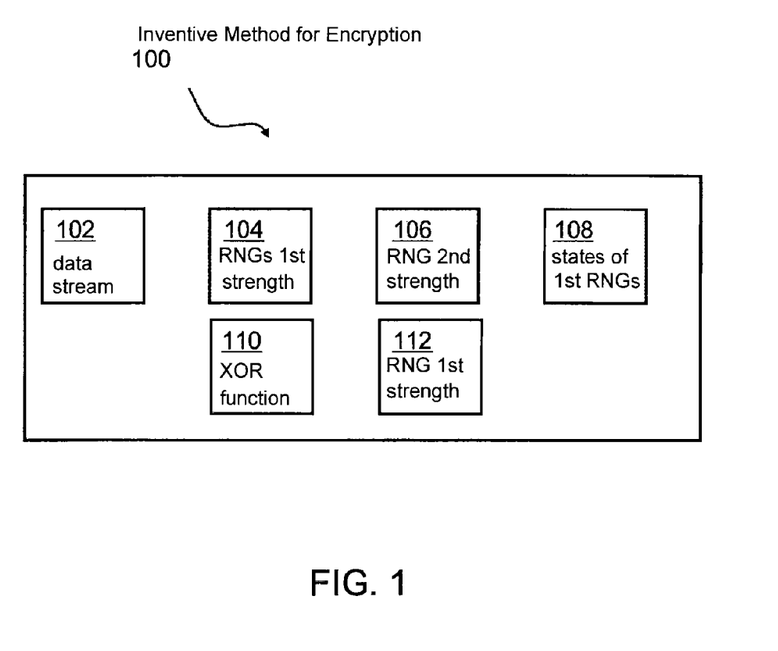
FIG. 1 shows a block diagram of one embodiment of a method, in accordance with one or more aspects of the present invention.

FIG. 1 shows a block diagram of an embodiment of the inventive method 100 for encryption. The method 100 may comprise providing, 102, the data stream, and providing, 104, at least two first random number generators having a first cryptographic strength, wherein each of the at least two first random number generators is switchable between states comprising a clocked state and a working state. Further, the method may comprise providing, 106, a second random number generator having a second cryptographic strength, wherein the cryptographic strength of the second random number generator is higher than cryptographic strength of the first random number generator. The method may also comprise a switching, 108, the states of the at least two first random number generators using an output of the second random number generator. Moreover, the method may comprise using, 110, an XOR-function for combining the data stream with an output of one of the at least two first random number generators which is in the working state, such that a ciphered data stream is created. The first RNG may be an LFSR or a congruential RNG. The second RNG may be a BBS having a higher cryptographic strength than an LFSR. In particular, FIG. 1 may also show providing, 112, at least a third first random number generator as described by claim 4.

Figure 2:
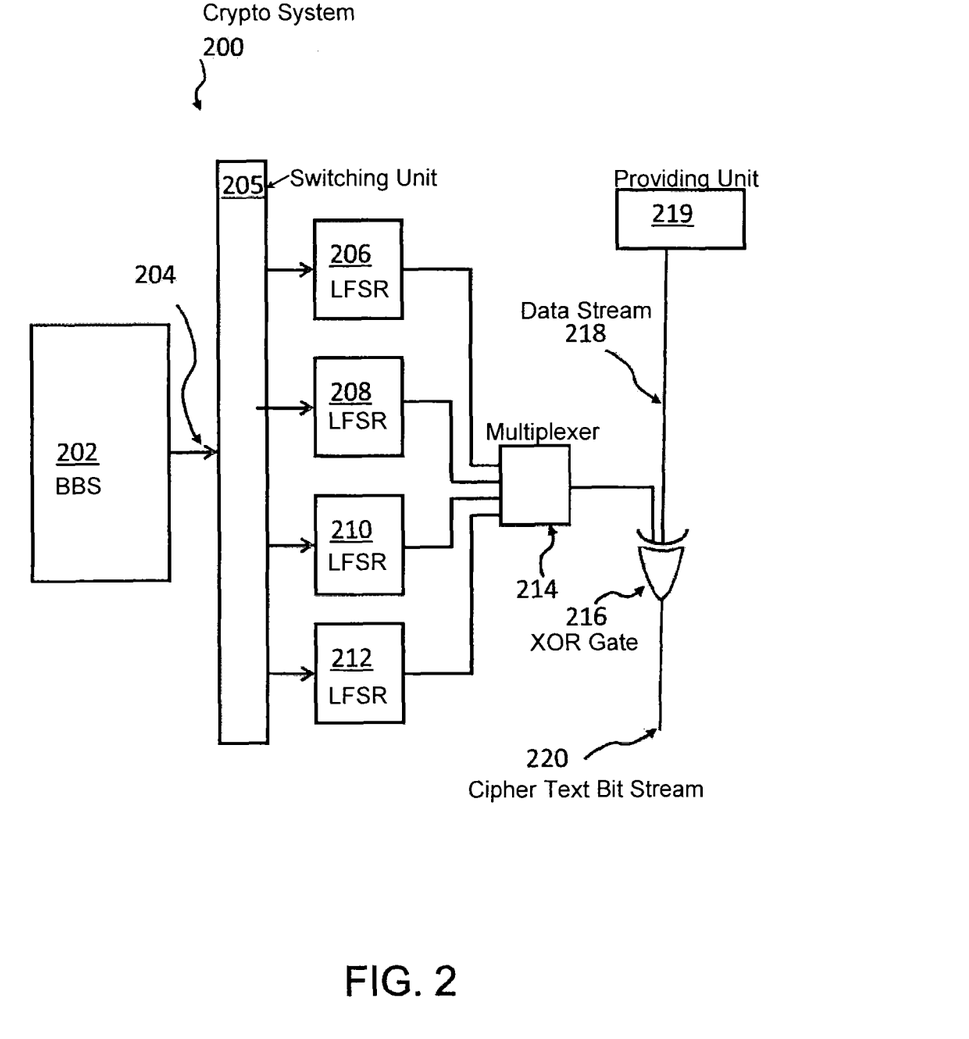
FIG. 2 shows one embodiment of a crypto system, in accordance with one or more aspects of the present invention.

FIG. 2 shows a block diagram of an embodiment of the invention. An embodiment of the invention may use four LFSRs, 206, 208, 210, 212, a table of 16 primitive densely populated generator polynomials for the LFSRs, and one 1024-bit-BBS. An application may generate a data stream 218 in form of a bit stream.

The incoming data stream may enter via line 218 from a providing unit 219. An XOR-gate 216 may combine the incoming data stream with a random number that may be delivered by a multiplexer 214. The multiplexer 214 may switch an output signal from one of the LFSRs 206, 208, 210, 212 in the working state to an input port of the XOR-gate 216.

A BBS 202 and a switching unit 205 may be used to switch between the statuses—i.e., working state, clocked stated and idle state—of the LFSRs 206, 208, 210, 212. An output 204 of the BBS 202 may control the switching unit 205.

In parallel to the LFSRs 206, 208, 210, 212, also the BBS 202 may create a stream of bits, in particular one random number per period. However, the generation of random numbers by the BBS 202 may be much slower than the generation by any LFSR 206 to 212. A period may be the time required between two consecutive random numbers generated by the BBS 202. The output 204 of the BBS 202 may be used to shuffle or switching the LFSR states. Because of the shuffle process, the effort to break the described random number generator may be as almost as hard as to break the BBS 202.

The cryptographic key of the BBS 202 may be "M" (modulus of the BBS), "s" (seed of the BBS), wherein "M" may be a 1024-bit-number and "s" may be at least a 160 bit number. "M" may be the modulus and "s" may be the starting value of the BSS 202.

The LFSRs 206, 208, 210, 212 and BBS 202 may be initialized as follows: The least 32 bits of "s" may define the set of a generator polynomial for the LFSRs 206, 208, 210, 212 using the following algorithm:

n=least 32 bits (bit 0 to bit 31) of "s". A list of all four out of 16 combinations of the polynomials may be generated (43680 elements) and the element i=n MOD 4680 may be chosen. Bits 31 to 159 may be used to initialize the four LFSRs 206, 208, 210, 212.

The BBS 202 may be executed two times to get into its start position. The encryption may be started now. At any clock cycle (=clock cycle, i.e., clock cycle of the LFSRs, not CPU clock cycles and not the period) the LFSRs 206, 208, 210, 212 in the working state may create one bit output, and the plain data stream may be shifted by one bit. The leading bit of the data stream may be "exclusive-ORed" with the output of the LFSR and may become the last bit of the cipher text bit stream 220.

Any e.g., 24 first RNG, e.g., LFSR clock cycles, the BBS may create its output. The three least significant bits may be used to create an output value named "perm". It may be noted that because one may get log(log(M)) bits from a BBS 202 to build a cryptographic strong random number, this three-bit-value may be a cryptographically strong number ($3<\log_2(\log_2(2^{1024}))=\log_2(1024)=10$). The output "perm" of the BBS may be used to define the shuffle process by using "perm" as an index to a table where the different shuffle operations may be defined.

In the current embodiment, the following shuffle or switching operations may be:

| perm | action | Changing state of LFSR |
|---|---|---|
| 0 | n = perm | Clocked-0 –> working –> idle –> clocked-0 |
| 1 | n = perm | Clocked-0 –> working –> idle –> clocked-1 –> clocked-0 |
| 2 | n = perm | Clocked-0 –> working –> clocked-0 |
| 3 | n = perm | Clocked-0 –> working –> clocked-1 –> idle –> clocked-0 |
| 4 | n = perm | Clocked-0 –> working –> clocked-1 –> clocked-0 |
| 5 | create n more bits, n = perm | Clocked-0 –> working –> idle –> clocked-0 |
| 6 | flip internal state clocked-1 and idle, n = perm | Clocked-0 –> working –> clocked-1 –> clocked-0 |

-continued

| perm | action | Changing state of LFSR |
|---|---|---|
| 7 | create n more bit, but do not clock the LFSRs in clocked state, n = perm | Clocked-0 −> working −> idle −> clocked-0 |

The numeric values of perm may be 0, 1, 2, . . . , 7 because 3 bits may be used as defined above. In total, four statuses may be used for the four LFSRs: working, clocked-0, clocked-1, idle. A read example of the table may be as follows: If perm=0 then the LFSR of status clocked-0 is shifted to status working, the LFSR of status working is shifted to status idle, the LFSR of status idle is shifted to status clocked-0.

It may be noted that for the case of perm=5, n=perm from the previous output of the BSS 202, hence 0<=n=<7.

In general, the number of different statuses used may be equivalent to the number of first RNGs used.

Figure 3:
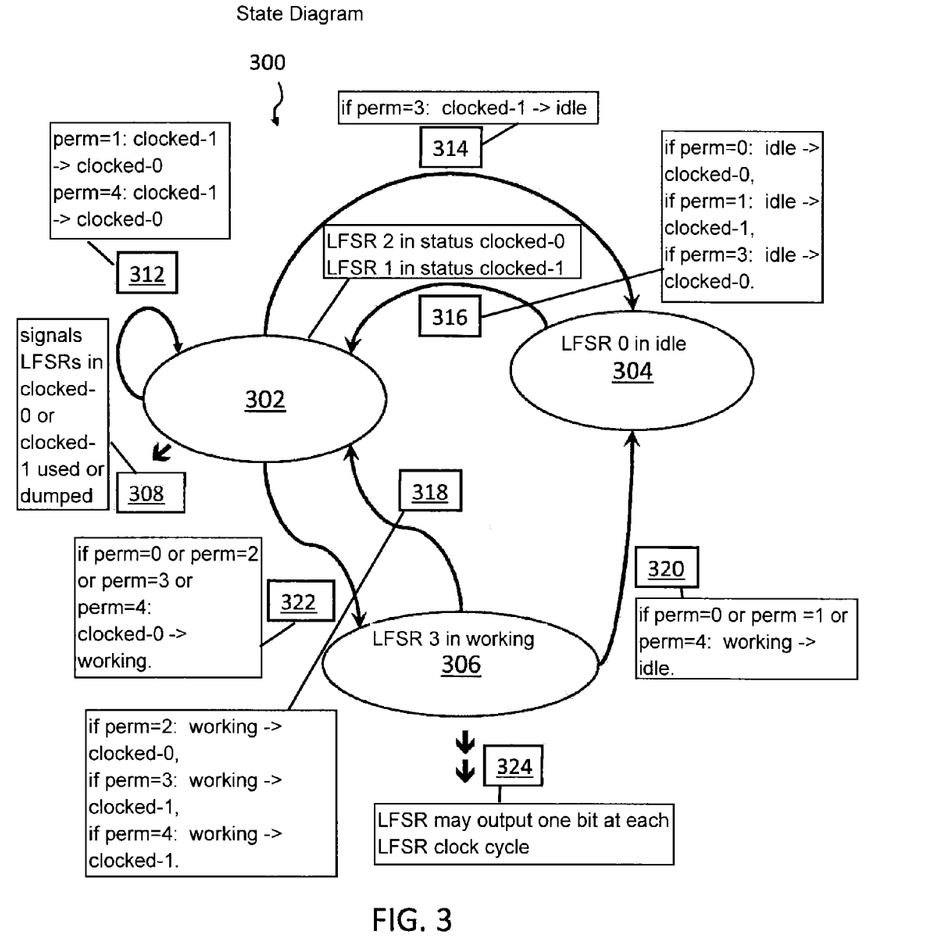
FIG. 3 shows a state diagram for one embodiment of the method and/or crypto system disclosed herein, in accordance with one or more aspects of the present invention.

FIG. 3 illustrates a state diagram 300 for one combined status of the system of the embodiment using the same status changes as the look-up table above. Four LFSRs named LFSR 0 to 3 may be used.

Ellipse 302 may represent LFSR 2 in status clocked-0 and LFSR 1 in status clocked-1. Ellipse 304 may represent LFSR 0 in the status idle and ellipse 306 may represent LFSR 3 in status working. It may be ensured that just one of the four LFSRs 0 to 3—which may correspond to the LFSRs with reference numbers 206, 208, 210, 212 in FIG. 2—may be in the working state: here LFSR 3.

The state diagram may also define transition rules from one status to another. Block 312 may symbolize the following conditions: If perm=1, the LFSR in status clocked-1 may be moved to clocked-0; or in short, "perm=1: clocked-1→clocked-0". If perm=4, the LFSR with status clocked-1 may move to status clocked-0 or in short, "perm=4: clocked-1→clocked-0".

The same nomenclature may be used for the following blocks with reference numeral: 314, 316, 318, 320 and 322.

Block 314: if perm=3: clocked-1→idle.
Block 316: if perm=0: idle→clocked-0,
if perm=1: idle→clocked-1,
if perm=3: idle→clocked-0.
Block 318: if perm=2: working→clocked-0,
if perm=3: working→clocked-1,
if perm=4: working→clocked-1.
Block 320: if perm=0 or perm=1 or perm=4: working→idle.
Block 322: if perm=0 or perm=2 or perm=3 or perm=4: clocked-0→working.

At 324, the working LFSR may output one bit at each LFSR clock cycle. At 308, output signals from LFSRs in status clocked-0 or clocked-1 may not be used or simply dumped.

Figure 4:
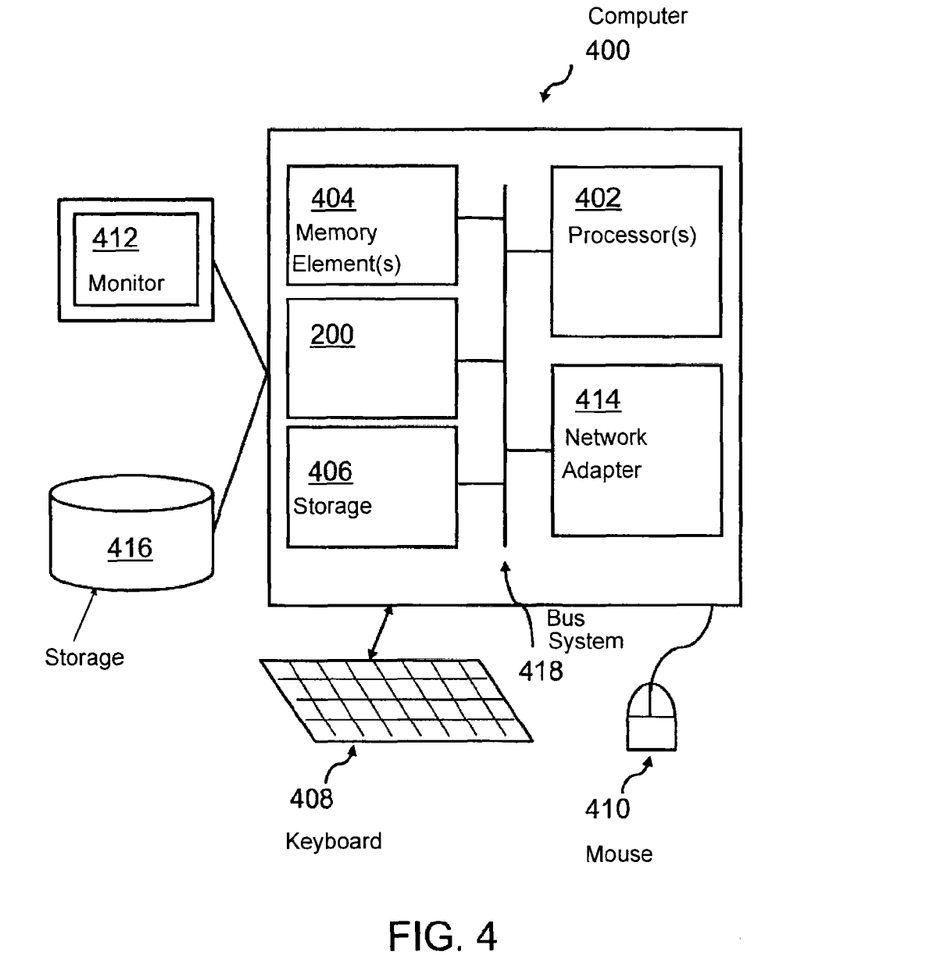
FIG. 4 shows one embodiment of a computer system including a crypto system, in accordance with one or more aspects of the present invention.

Embodiments of the invention may partly be implemented on virtually any type of computer, regardless of the platform being used suitable for storing and/or executing program code. For example, as shown in FIG. 4, a computer system 400 may include one or more processor(s) 402 with one or more cores per processor, associated memory elements 404, an internal storage device 406 (e.g., a hard disk, an optical drive such as a compact disk drive or digital video disk (DVD) drive, a flash memory stick, etc.), and numerous other elements and functionalities typical of today's computers (not shown). The memory elements 404 may include a main memory, employed during actual execution of the program code, and a cache memory, which provides temporary storage for at least some program code or data in order to reduce the number of times, code must be retrieved from external bulk storage 416 for execution. Elements inside the computer 400 may be linked together by means of a bus system 418 with corresponding adapters. Additionally, a crypto system 200 may be attached to the bus system 418.

The computer system 400 may also include input means, such as a keyboard 408, a mouse 410, or a microphone (not shown). Furthermore, the computer 400 may include output means, such as a monitor 412 [e.g., a liquid crystal display (LCD), a plasma display, a light emitting diode display (LED), or a cathode ray tube (CRT) monitor]. The computer system 400 may be connected to a network (e.g., a local area network (LAN), a wide area network (WAN), such as the Internet, or any other similar type of network, including wireless networks via a network adapter 414. This may allow a coupling to other computer systems. Those, skilled in the art will appreciate that many different types of computer systems do exist, and the aforementioned input and output means may take other forms. Generally speaking, the computer system 400 may include at least the minimal processing, input and/or output means, necessary to practice embodiments of the invention.

Further, those skilled in the art will appreciate that one or more elements of the aforementioned computer system 400 may be located at a remote location and connected to the other elements over a network. Further, embodiments of the invention may be implemented on a distributed system having a plurality of nodes, where each portion of the invention may be located on a different node within the distributed system. In one embodiment of the invention, the node may correspond to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

It may be noted that the data stream may comprise a stream of bits. Additionally, it may be mentioned that two first RDGs may be the lowest number of first RDG. The higher the number of first RDGs, the higher the cryptographic strength of the method and the crypto system may be. If three first RDGs may be provided a third state may also be useful: an idle state.

It should also be noted that the first RDG may be a linear feedback shift register random number generator (LFSR). The second RDG may be a Blum-Bum-Shub RDG (BBS). However, the first RNG may be any other kind of RNG, e.g., a linear congruential random number generator or another BBS, as long as the BBS used as first RNGs may be different to the second RNG. Also a mixture of different types of RNGs as first RNGs may be possible.

The XOR-function may also be replaced by any other function. The only restriction between the ciphering side and the de-ciphering side may be that the two functions f(x) and g(x)—on the ciphering side and the other on the de-ciphering side—may relate to each other as a function and a reverse function, i.e. f(g(x))=x. An XOR-function may be a well known solution. However, any other pair of function may fulfil this requirement.

In the context of this application, the following principle terms are used:

Data stream—The term data stream may denote a stream of bits—or groups of bits—to be transmitted through a transmission medium. That may be a plain text, or any other stream of serialized data, e.g., image data, voice data stream or video data streams.

Random number generator—The term random number generator may denote a computational or physical device designed to generate a sequence of numbers or symbols that lack any pattern, i.e., appear random. Random number generators that are algorithm based typically generate a pseudo-random number. I.e., if a given set of start values is reused the random number generator generates the same sequence of numbers again.

In encryption/decryption systems this effect may be used for decrypting of an encrypted message. Thereby, the key and/or start values for the encryption may be transmitted via a secure channel such that they may be reused for decryption.

LFSR—The term LFSR may denote a linear feedback shift register random number generator. A linear feedback shift register may be a shift register whose input bit may be a linear function of its previous state. The only linear function of single bits may be XOR, thus, it may be a shift register whose input bit may be driven by the exclusive-or (XOR) of some bits of the overall shift register value. The initial value of the LFSR may be called the seed. Because the operation of the register may be deterministic, the stream of values produced by the register may be completely determined by its current (or previous) state. Likewise, because the register may have a finite number of possible states, it must eventually enter a repeating cycle. However, an LFSR with a well-chosen feedback function may produce a sequence of bits which appears random and which has a very long cycle. Both, hardware and software implementations of LFSRs may be common.

Working state—The term working state may denote a status of a first RDG, e.g. an LFSR. In the working state, the first RDG may be clocked, i.e., a clock signal may be provided and an output of the first RDG may be used for further processing, i.e., encryption.

Clocked state—The term clocked state may denote a status of a first RDG. In the clocked state, the first RDG may be clocked, i.e., a clock signal may be provided and an output of the first RDG may not be used for further processing, i.e., encryption.

Idle state—The term idle state may denote a status of a first RDG. In the idle state, the first RDG may be idle, i.e., a clock signal may not be provided and an output of the first RDG may not be used for further processing, i.e., encryption.

XOR-function—The term XOR-function may denote the known logic function of an exclusive-or operation of at least two single bit signals generating one output bit signal.

BBS—The term BBS may denote a Blum-Blum-Shub random number generator as proposed by Lenore Blum, Manuel Blum and Michael Shub. It may take the form:

$$x_{n+1} = x_n^2 \bmod M$$

wherein M is a product of two large prime numbers. At each step of the algorithm, some output may be derived from $x_{n+1}$. The output may commonly either be the bit parity of or one or more least significant bits of $x_{n+1}$. It may be known that the algorithm may be relatively slow because of complex multiplications. Hardware accelerators may be useful for a usage of the algorithm, e.g., the crypto card of IBM's z system computer or the synergistic processing unit (SPU) in IBM's cell blade system.

Cryptographic strength—This term may denote a security of ciphering of the encryption method. It may not only relate to a randomness of a random number generated by an RNG being used for ciphering. Additionally, another condition must be fulfilled: From a known part of a period and a known algorithm but unknown seed value it may not be possible to break to code faster than by brute force.—A BBS may have a relative high cryptographic strength if compared to the cryptographic strength of an LFSR or a congruential RNG. The downside of a conventional system with a high cryptographic strength may be in the high computational requirement for the ciphering and de-ciphering. This may also be true for attacks on the encrypted data.

Period—The term period may denote the time required between two consecutive random numbers generated by the Blum-Blum-Shub random number generator. It may be measured in a number of output bits, which may equal the number of bits generated by the LFSR in the working state.

The above-described method for encryption as well as the crypto system may provide a couple of advantages. In particular, this method and system may disclose a random number generator for stream cipher that may combine the performance of LFSRs with the cryptographic strength of the BBS random number generator. This combined random number generator may be implemented to encrypt and decrypt a data bit stream. A skilled person may know how to implement a decryption system if an encrypted data stream may have been ciphered using a pseudo-random number generator.

Because of a shuffle process between active first RDGs, the effort for breaking the combined random number generator algorithm of the described method may be almost as hard as to break a BBS algorithm or key. The random number generator of the method may be about n-times faster than a BBS wherein n may be the period as defined above.

In one embodiment of the method, only one of the at least two first RDGs may be in the working state. It may be advantageous if only exactly one of the two or more first RDGs may be in the working state. Technically, it may be possible to work with more than one first RDG in the working state. However, one effect may be that of another single first RDG.

In another embodiment of the method, at least one of the at least two first RDGs may be in the clocked state. It may be advantageous if at least one of all available first RDGs may be in the clocked state in order to improve the cryptographic strength of the method.

In another embodiment the method may also comprise providing at least a third first RDG, wherein each of the at least three first RDGs may be switchable between the clocked state, the working state and in particular additionally an idle state. In this idle state, the respective first RDG may not be active at all. However, one of all first RDGs may be in the working state in order to generate random numbers for the encryption process.

In one embodiment of the method, a number of the first RDGs in the clocked state may be at least twice as high as a number of first RDGs in the working state. Because one of the first RDGs may be in the working state, the above condition may express that at least two first RDGs may be in the clocked state in order to have a high cryptographic strength. However, more than two first RDGs may be in the clocked state. It may also be noted that before a first RDG may be switched into the working state, it may have been in the clocked state before for at least one period. However, it may not be required to be in the clocked state just before being switched into the working state. It may be in the idle state before being switched into the working state and after being in the clocked state. The number of states available in the system may be equal to the number of available first RDGs.

In yet another embodiment of the method, at least one of the first RDGs may be in the idle state. Again, the more first RDGs may be used for the method and the crypto system the higher may be the cryptographic strength of the overall system executing the method.

In one advantageous embodiment of the method, a bit of the output of the first RDG in the working state and a leading bit of the data stream may be combined using the XOR-function generating a last bit of the ciphered data stream. Because of this, a breaking of the encryption of the data stream may become very difficult—the potential security attack may not know the method used for the random number generation.

In another embodiment of the method, the one bit of the output of the first RDG in the working state may be generated during a fraction of one period plus a delta, wherein the period may be a time required between two consecutive random numbers generated by the second RDG. This may mean that more than one random numbers may be generated during one period. If only one BBS may have been used, a generation of a random number may be much slower because of the high computing requirement for a BBS. The performance improvements, together with the high security standards achieved, may be seen in this combined first RDGs and second RDG approach. More than one bit of the data stream may be ciphered during one second RDG period.

In another advantageous embodiment of the method, the number of the one bit of the output of the first RDGs in the working state generated during one period may not exceed the number of bits of a shortest linear feedback shift register of an LFSRs used as first RDG. This condition may also improve the cryptographic strength of the encryption method. Technically, there may be no limitations in allowing a longer period such that more random numbers may be generated by the LFSR with the shortest shift register. However, if the number of random numbers generated by the LFSR with the shortest shift register may be smaller—in particular half as much—than half of the length of the shift register, it may improve the security achieved, i.e., the cryptographic strength of the method. If, e.g. an LFSR shift register may be 32 bit long, than the number of random numbers generated by the LFSR during a period of the BSS may not exceed 32, and in particular not exceed 16. Generally speaking, the lower the number of generated numbers by the LFSRs during a period—i.e., bits for the encryption process—the better, i.e., more secure. However, a trade-off between costs for additional registers and cryptographic strength may be made.

In one embodiment, the delta may be a positive or negative integer. Zero may also be used as a value for the delta. This may allow a dynamic adaption of the cryptographic strength within a data stream. If e.g., an email may be encrypted, which may have a header and/or footer which may not require a strong encryption, then the delta may be a positive number making the effective periods longer, and thus, the ciphering less secure, but faster. For those parts of data to be encrypted that need a high security, the delta may be made negative, and thus, the periods shorter and the cryptographic strength higher. Hence, the speed and the security may be managed dynamically. The delta may be an integer because the period may be measured in cycles of the first RDGs.

In another embodiment of the method, the XOR-function may create a stream of bit groups. This means that not only a bit-wise encryption may be possible. Also byte-wise encryption may be used for an even higher performance of the method. In this case, a plurality of XOR-functions may be required. They may work in parallel or in another configuration according to a specific application.

It should be noted that embodiments may take the form of an entire hardware implementation, an entire software embodiment or an embodiment containing both, hardware and software elements. In a preferred embodiment, the invention may be implemented in software which includes, but may not be limited to, firmware, resident software and microcode.

In one embodiment, a data processing program for execution in a data processing system may be provided comprising software code portions for performing the method, as described above, when the program may run on a data processing system. The data processing system may be a computer or computer system combined with the crypto system by communications means.

Furthermore, embodiments may take the form of a computer program product, accessible from a computer-usable, or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention may be apparent from the examples of embodiments to be described hereinafter and are explained with reference to the examples of embodiments, but to which the invention is not limited.

While the invention has been described with respect to a limited number of embodiments, those skilled in the art, benefiting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

What is claimed is:

1. A method for encryption of a data stream, the method comprising:
   providing the data stream;
   providing at least two first random number generators having a first cryptographic strength, wherein each of the at least two first random number generators is switchable between states comprising a clocked state and a working state;
   providing a second random number generator having a second cryptographic strength, wherein the second cryptographic strength is higher than the first cryptographic strength;
   based on an output of the second random number generator, switching states of the at least two first random number; and
   generating a ciphered data stream utilizing an XOR-function for combining the data stream with an output of one of the at least two first random number generators which is in the working state.

2. The method according to claim 1, wherein only one of the at least two first random number generators is in the working state.

3. The method according to claim 1, wherein at least one of the at least two first random number generators is in the clocked state.

4. The method according to claim 1, further comprising:
   providing at least a third first random number generator, wherein each of the at least two first random number generators is switchable between the clocked state, the working state and an idle state.

5. The method according to claim 4, wherein a number of the first random number generators in the clocked state is at least twice as high as a number of first random number generators in the working state.

6. The method according to claim 4, wherein at least one of the first random number generators is in the idle state.

7. The method according to claim 1, wherein a bit of the output of the first random number generator in the working state and a leading bit of the data stream are combined using the XOR-function generating a last bit of the ciphered data stream.

8. The method according to claim 7, wherein the one bit of the output of the first random number generator in the working state is generated during a fraction of one period plus an delta, wherein the period is a time required between two consecutive random numbers generated by the second random number generator.

9. The method according to claim 8, wherein the number of the one bit of the output of the first random number generators in the working state generated during one period does not exceed the number of bits of a shortest linear feedback shift register of linear feedback shift register random number generators used a first random number generators.

10. The method according to claim 8, wherein the delta is a positive or negative integer.

11. The method according to claim 1, wherein the XOR-function creates a stream of bit groups.

12. A crypto system for encryption of a data stream within a computing environment, the crypto system comprising:
   a memory; and
   a processor in communication with the memory, wherein the crypto system is configured to perform a method, the method comprising:
      providing the data stream;
      providing at least two first random number generators having a first cryptographic strength, wherein each of the at least two first random number generators is switchable between states comprising a clocked state and a working state;
      providing a second random number generator having a second cryptographic strength, wherein the second cryptographic strength is higher than the first cryptographic strength;
      based on an output of the second random number generator, switching states of the at least two first random number generators; and
      generating a ciphered data stream utilizing an XOR-gate for combining the data stream with an output of one of the at least two first random number generators which is in the working state.

13. The crypto system of claim 12, wherein only one of the at least two first random number generators is in the working state.

14. The crypto system of claim 12, wherein at least one of the at least two first random number generators is in the clocked state.

15. The crypto system of claim 12, further comprising providing at least a third first random number generator, wherein each of the at least two first random number generators is switchable between the clocked state, the working state and an idle state.

16. The crypto system of claim 12, wherein a bit of the output of the first random number generator in the working state and a leading bit of the data stream are combined using the XOR-function generating a last bit of the ciphered data stream.

17. The crypto system of claim 16, wherein the one bit of the output of the first random number generator in the working state is generated during a fraction of one period plus an delta, wherein the period is a time required between two consecutive random numbers generated by the second random number generator.

18. The crypto system of claim 17, wherein the number of the one bit of the output of the first random number generators in the working state generated during one period does not exceed the number of bits of a shortest linear feedback shift register of linear feedback shift register random number generators used a first random number generators.

19. The crypto system of claim 16, wherein the delta is a positive or negative integer.

20. A computer program product for encryption of a data stream, the computer program product comprising:
   a non-transitory tangible computer-readable storage medium readable by a processor and storing instructions for execution by the processor for performing a method comprising:
      providing the data stream;
      providing at least two first random number generators having a first cryptographic strength, wherein each of the at least two first random number generators is switchable between states comprising a clocked state and a working state;
      providing a second random number generator having a second cryptographic strength, wherein the second cryptographic strength is higher than the first cryptographic strength;
      based on an output of the second random number generator, switching the states of the at least two first random number generators; and
      generating a ciphered data stream utilizing using an XOR-function for combining the data stream with an output of one of the at least two first random number generators which is in the working state.

* * * * *